United States Patent Office 2,759,952
Patented Aug. 21, 1956

2,759,952

CYCLOPENTANO-PHENANTHRENE COMPOUNDS

Max N. Huffman, Oklahoma City, Okla., assignor to Lasdon Foundation, Inc., Yonkers, N. Y., a corporation of Delaware No Drawing. Application August 1, 1955,
Serial No. 525,801

13 Claims. (Cl. 260—397.5)

This invention relates to certain novel compounds of the androstene series, and relates more particularly to the novel compounds $\Delta^5$-androsten-3$\beta$,16$\beta$-diol and $\Delta^5$-androsten-3$\beta$,16$\alpha$-diol and to the ethers and esters of said compounds.

An object of this invention is the preparation of compounds of the androstene series having diminished or minimal hormonal activity but which exhibit other useful physiological action.

Another object of this invention is the provision of novel chemotherapeutic compounds which exert a favorable physiological response, particularly in hypertensive states.

Other objects of this invention will appear from the following detailed description.

The intensive study of chemical compounds of the cyclopentanophenanthrene group has clearly shown that the effects of stereo or structural isomerism cause a marked variation in the physiological action of these compounds. Many of the stereo and structural isomers of hormonally active compounds are known. Some are found in nature. Others have not been isolated from natural sources but are formed by chemical alteration of the known compounds. For example, $\Delta^5$-androsten-3$\beta$,17$\beta$-diol is a urinary steroid which has been identified as a metabolic product associated with adrenal dysfunction. Naturally-occurring stereo or structural isomers of this compound are, however, unknown.

In accordance with my invention, I have found that by suitable chemical alteration of the molecular configuration of $\Delta^5$-androsten-3$\beta$,17$\beta$-diol, valuable structural isomers of this steroid are obtained which, although free of androgenic activity, are highly effective in hypertensive states. The novel steroid compounds of my invention exert a strong hypotensive action on oral administration and have been observed to effectively reduce blood pressure in hypertensive states.

The novel steroid compounds of my invention comprise $\Delta^5$-androsten-3$\beta$,16$\beta$-diol and $\Delta^5$-androsten-3$\beta$,16$\alpha$-diol, and the functional derivatives of these novel compounds including the ethers and esters. More particularly, the compounds of my invention may be represented by the following general formula:

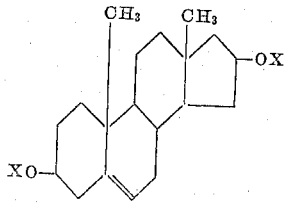

wherein X is selected from the group consisting of hydrogen and —R and in which R is a monovalent radical of the group consisting of methyl, ethyl, propyl, butyl, amyl, vinyl, cyclopentylpropyl, acetyl, propionyl, butyryl, cyclopentylpropionyl, benzoyl, palmityl, benzyl, tolyl, and naphthyl groups.

The particular species of my invention comprising $\Delta^5$-androsten-3$\beta$,16$\beta$-diol may be obtained, for example, by converting dehydroepiandrosterone to $\Delta^5$-androsten-3$\beta$-ol-16-one, in accordance with the process more particularly described in my copending application S. No. 501,210 filed on April 13, 1955, and then reducing the $\Delta^5$-androsten-3$\beta$-ol-16-one obtained. Conveniently, a reducing agent such as sodium borohydride, lithium aluminum hydride or lithium borohydride may be employed.

The process of converting dehydroepiandrosterone to $\Delta^5$-androsten-3$\beta$-ol-16-one comprises nitrosating the 17-keto group present on the former with isoamyl nitrite and potassium t-butoxide in t-butyl alcohol, and subjecting the 16-oximino-17-keto compound obtained to a Stodola reduction with zinc dust and acetic acid to form the corresponding 16-keto-17-hydroxy compound. The latter is reacted with an aryl sulfonyl chloride, such as benzene sulfonyl chloride or p-toluene sulfonyl chloride to form the 16-keto-17-aryl sulfonate and the 16-keto group reduced to a 16-hydroxy group with a reducing agent such as sodium borohydride, lithium aluminum hydride or lithium borohydride, for example. On reaction of the 16-hydroxy-17-aryl sulfonate with an alkali metal hydroxide, the aryl sulfonic acid is split out, yielding $\Delta^5$-androsten-3$\beta$-ol-16-one with the 17-position being free of any functional group.

The stereo isomer $\Delta^5$-androsten-3$\beta$,16$\alpha$-diol may be obtained by epimerizing $\Delta^5$-androsten-3$\beta$,16$\beta$-diol. This reaction comprises forming the di-tosylate of $\Delta^5$-androsten-3$\beta$,16$\beta$-diol by reaction with p-toluene sulfonyl chloride followed by selective hydrolysis of the ester at C$_3$ to yield the free hydroxy group. Epimerization at C$_{16}$ by reaction of the $\Delta^5$-androsten-3$\beta$,16$\beta$-diol-16-p-toluene sulfonate with sodium acetate in acetic acid forms $\Delta^5$-androsten-3$\beta$,16$\alpha$-diol-16-acetate and hydrolysis of the latter yields the isomer $\Delta^5$-androsten-3$\beta$,16$\alpha$-diol.

Alternatively, $\Delta^5$-androsten-3$\beta$,16$\alpha$-diol may be obtained by esterifying $\Delta^5$-androsten-3$\beta$-ol-16-one with acetic anhydride to block the C$_3$ hydroxy group and to form 3$\beta$-acetoxy-$\Delta^5$-androsten-16-one followed by the reduction of the 16-keto group to yield 3$\beta$-acetoxy-$\Delta^5$-androsten-16$\beta$-ol. The latter compound is then reacted with p-toluene sulfonyl chloride to form the C$_{16}$-p-toluene sulfonate which is epimerized as described above by the acetate exchange reaction to form 3$\beta$-acetoxy-16$\alpha$-acetoxy-$\Delta^5$-androstene and the diacetate then hydrolyzed to $\Delta^5$-androsten-3$\beta$,16$\alpha$-diol.

The novel compounds of my invention may also be obtained utilizing a C$_3$ ether of $\Delta^5$-androsten-3$\beta$-ol-16-one as the starting material. The desired ether may be obtained utilizing an etherifying agent such as dimethyl sulfate, diethyl sulfate, dibenzyl sulfate and the like. Thus, I may start with the 3-methyl, 3-ethyl, 3-propyl, 3-butyl, 3-isoamyl, 3-amyl, 3-vinyl, 3-cyclopentylpropyl, 3-benzyl, 3-tolyl, and 3-naphthyl ether of said $\Delta^5$-androsten-3$\beta$-ol-16-one, subject the 16-keto group of the latter to reduction, as described, to form the corresponding 16$\beta$-hydroxy compound. The free 16$\beta$-hydroxy group is then converted to the p-toluene sulfonate and the latter epimerized with sodium acetate in acetic acid to form the 16$\alpha$-acetoxy compound. Selective hydrolysis yields $\Delta^5$-androsten-3$\beta$-ether-16$\alpha$-ol. The free hydroxy group may be etherified as described.

Both hydroxy groups of $\Delta^5$-androsten-3$\beta$,16$\beta$-diol and $\Delta^5$-androsten-3$\beta$,16$\alpha$-diol may readily be esterified by reacting said compounds with, for example, acetic anhydride, benzoyl chloride, propionic anhydride, palmityl chloride, cyclopentylpropionyl chloride and the like to yield the corresponding di-acetate, di-benzoate, di-propionate, di-palmitate and di-cyclopentylpropionate esters.

In order further to illustrate my invention but without being limited thereto, the following examples are given:

Example I

To 1.0 grams of Δ⁵-androsten-3β-ol-16-one in 50 ml. of methanol are added a solution of 0.8 grams of sodium borohydride in 10 ml. of methanol and the temperature of the mixture is maintained at 0–5° C. for 1.5 hours. To the reaction mixture is then added 1 liter of an aqueous 5% solution of sodium chloride and the Δ⁵-androsten-3β,16β-diol is precipitated out. The product is recrystallized from a 60% aqueous methanol solution containing decolorizing carbon. An 88% yield of Δ⁵-androsten-3β,16β-diol is obtained melting at 143–144.5° C. On further recrystallization from 80% aqueous methanol the melting point is raised to 146–147° C. Analysis for $C_{19}H_{30}O_2$ on thoroughly dried material is:

|  | Percent C | Percent H |
|---|---|---|
| Calculated | 78.57 | 10.41 |
| Found | 78.70 | 10.34 |

The optical rotation is $[\alpha]_D^{22} = -61°$ (c=1.10 in 95% ethanol).

Example II 99 mg. of Δ⁵-androsten-3β,16β-diol melting at 145–145.5° C. are dissolved in about 10 parts by weight of dry pyridine and about 10 parts by weight of acetic anhydride are added. After mixing thoroughly and permitting the mixture to stand for 24 hours at about 25° C., about 500 parts by weight of ice water are added to precipitate the Δ⁵-androsten-3β,16β-diol-di-acetate. The product is filtered off and purified by recrystallization from 80% aqueous methanol. The product forms flat, silky needles melting at 127.5–128° C. A yield of 98 mg. is obtained. Analysis for $C_{23}H_{34}O_4$ is:

|  | Percent C | Percent H |
|---|---|---|
| Calculated | 73.76 | 9.15 |
| Found | 73.96 | 9.19 |

The optical rotation is $[\alpha]_D^{23} = -65°$ (c=1.04 in chloroform).

Example III

Δ⁵-androsten-3β,16β-diol is converted to Δ⁵-androsten-3β,16β-diol-di-benzoate by dissolving 130 mg. of the Δ⁵-androsten-3β,16β-diol in 6.0 ml. of pyridine containing 1.5 ml. of benzoyl chloride. The reaction mixture is maintained at room temperature for 24 hours and the di-benzoate formed is precipitated by adding 100 ml. of ice water. The product is purified by recrystallizing several times from 95% aqueous ethanol. A yield of 155 mg. of Δ⁵-androsten-3β,16β-diol-di-benzoate in the form of fine, silky needles melting at 193–193.5° C. is obtained. Analysis for $C_{33}H_{38}O_4$ is:

|  | Percent C | Percent H |
|---|---|---|
| Calculated | 79.48 | 7.68 |
| Found | 79.65 | 7.70 |

Example IV 813 mg. of Δ⁵-androsten-3β,16β-diol are added to a solution of 6 grams of p-toluene sulfonyl chloride in 18 ml. of pyridine while maintaining the reaction mixture at 0° C. The mixture is thoroughly agitated and permitted to stand with the temperature gradually rising to room temperature. After remaining at room temperature for 24 hours, ice water is slowly added to the reaction mixture to precipitate the Δ⁵-androsten-3β,16β-diol-di-p-toluene sulfonate. The product is filtered, washed with water and dried and is then dissolved in 82 ml. of alcohol-free acetone to which is added 27 ml. of water containing about 0.2 grams of sulfuric acid. The resulting acidic solution is refluxed for 4 hours, additional water is introduced and the volume reduced by distillation until the clear solution becomes turbid. This selective hydrolysis forms 365 mg. of Δ⁵-androsten-3β,16β-diol-16-p-toluene sulfonate which is purified by recrystallization from aqueous acetone containing decolorizing carbon. The latter compound melts at 91–96° C. Analysis for $C_{26}H_{36}O_4S$ is:

|  | Percent S |
|---|---|
| Calculated | 7.21 |
| Found | 6.99 |

330 mg. of the above 16-p-toluene sulfonate are epimerized by adding the latter to 16 ml. of purified acetic acid containing 0.8 gram of freshly fused sodium acetate and heating the mixture under reflux for one hour. The Δ⁵-androsten-3β,16α-diol-16-acetate formed is separated by cooling the reaction mixture and precipitating the compound by the addition of 250 ml. of ice water. After the mixture containing the precipitate is maintained at about 5° C. for 24 hours, the product is filtered off and dried. In order to obtain the free Δ⁵-androsten-3β,16α-diol, the ester is saponified by adding the product to a solution of 100 ml. of methanol, and 19 ml. of sodium hydroxide solution containing 1.9 grams of sodium hydroxide and allowing the mixture to stand for 24 hours at room temperature. The alkaline mixture is then shaken in a separatory funnel with a mixture of ethyl ether and dilute aqueous sodium hydroxide so that the ethyl ether preferentially extracts the steroid material. The ether is separated, washed with dilute aqueous sodium hydroxide and then with water. After removal of the ether the residue is recrystallized twice from a mixture of acetone-Skellysolve B and then twice from aqueous 70% methanol. A yield of 74 mg. of Δ⁵-androsten-3β,16α-diol is obtained melting at 213–214° C. Analysis for $C_{19}H_{30}O_2$ is:

|  | Percent C | Percent H |
|---|---|---|
| Calculated | 78.57 | 10.41 |
| Found | 78.50 | 10.33 |

The optical rotation is $[\alpha]_D^{22} = -110°$ (c=1.09 in 95% ethanol).

Example V 992 mg. of Δ⁵-androsten-3β-ol-16-one melting at 162–163° C. is acetylated with acetic anhydride in pyridine and the 3β-acetoxy-Δ⁵-androsten-16-one formed is separated by precipitating it from solution by the addition of water. After drying, the acetate thus separated is dissolved in 80 ml. of ethyl acetate and a solution of 8/10 grams of sodium borohydride in 80 ml. of ethanol added and after thorough mixing, the solution allowed to stand for 15 minutes at room temperature. Ice water is added to precipitate the 3β-acetoxy-Δ⁵-androsten-16β-ol which is then filtered off, washed well with water and dried at 40° C. The product is then added to a solution of 2 grams of p-toluene sulfonyl chloride in 20 ml. of pyridine and the mixture allowed to stand for 120 minutes at 0° C. and for 24 hours at 25° C. The Δ⁵-androsten-3β,16β-diol-3-acetate-16-p-toluenesulfonate is precipitated from solution by the addition of ice water and the product then filtered off, washed with ice water and dried. The product is then epimerized at C₁₆ to yield Δ⁵-androsten-3β,16α-diol-di-acetate by adding it to a solution of 3.2 grams of freshly fused sodium acetate in 64 ml. of purified acetic acid and heating it under reflux for one hour, and then precipitating with much ice water. The ester thus formed is saponified by adding it to a solution of 8 parts by weight of sodium hydroxide in 80 parts by weight of water containing 240 parts by weight of methanol and maintaining the resulting solution at room temperature for about 24 hours. The alkaline reaction mixture is partitioned by shaking with ethyl ether and dilute aqueous alkali in a suitable vessel. The aqueous phase is withdrawn and the ethyl ether phase washed twice with dilute aqueous sodium hydroxide and then washed thoroughly with water. The aqueous liquid from the alkali and water washes is thoroughly extracted with ether and the ethereal extracts combined. The ether is vaporized from the combined ether extracts and the residue recrystallized twice from a mixture of acetone-Skellysolve B followed by recrystallization from aqueous methanol. A yield of 381 mg. or 39% of theory of Δ⁵-androsten-3β,16α-diol is obtained melting at 213.5–214.5° C.

Example VI 151 mg. of Δ⁵-androsten-3β,16α-diol prepared as described in Example V is acetylated in a mixture of pyridine and acetic anhydride. The Δ⁵-androsten-3β,16α-diol-di-acetate formed is purified by recrystallization from methanol to yield 169 mg. of needle-like flakes which melt at 186.5–187.5° C. Further recrystallization from methanol raises the melting point to 187–187.5° C. Analysis for $C_{23}H_{34}O_4$ is:

|  | Percent C | Percent H |
| --- | --- | --- |
| Calculated | 73.76 | 9.15 |
| Found | 73.84 | 9.16 |

The optical rotation is $[\alpha]_D^{23} = -88°$ (c=1.07 in chloroform).

Example VII

Δ⁵-androsten-3β,16α-diol-di-benzoate is obtained by reacting Δ⁵-androsten-3β,16α-diol with benzoyl chloride in pyridine. The di-benzoate formed is recrystalled from 95% aqueous ethanol and is found to have a melting point of 180–181° C. Analysis for $C_{33}H_{38}O_4$ is:

|  | Percent C | Percent H |
| --- | --- | --- |
| Calculated | 79.48 | 7.68 |
| Found | 79.48 | 7.72 |

Example VIII 978 mg. of 3β-methoxy-Δ⁵-androsten-16-one melting at 135–136° C. is reduced by reacting it with a solution of 0.8 grams of sodium borohydride in 80 ml. methanol at room temperature for 30 minutes. The 3β-methoxy-Δ⁵-androsten-16β-ol is precipitated by adding water to the reaction mixture, the precipitation being made as complete as possible by the addition of sodium chloride to the water thus added. The precipitate is recrystallized twice from an aqueous solution of methanol containing decolorizing carbon to give 700 mg. of 3β-methoxy-Δ⁵-androsten-16β-ol melting at 132–133° C. About ⅔ of the latter is further purified by recrystallization from a mixture of acetone-Skellysolve B and then again from 80% aqueous methanol to yield 154 mg. of 3β-methoxy-Δ⁵-androsten-16β-ol melting at 133.5–134° C. Analysis for $C_{20}H_{32}O_2$ is:

|  | Percent C | Percent H |
| --- | --- | --- |
| Calculated | 78.89 | 10.59 |
| Found | 79.02 | 10.54 |

The optical rotation is $[\alpha]_D^{29} = -70°$ (c=1.05 in 95% aqueous ethanol).

Example IX

3β-methoxy-Δ⁵-androsten-16β-ol is converted to 3β-methoxy-Δ⁵-androsten-16α-ol by esterifying the 16β-hydroxy group with p-toluene sulfonyl chloride to form the 16-p-toluene sulfonate and the latter epimerized with fused sodium acetate in acetic acid to form 3β-methoxy-16α-acetoxy-Δ⁵-androstene. The 16-acetate is saponified by refluxing the product in an aqueous methanol solution of potassium hydroxide. After separation of the crude product and recrystallization from Skellysolve-B and then from aqueous methanol, the 3β-methoxy-Δ⁵-androsten-16α-ol is obtained in the form of fine, short needles melting at 139–140° C. Analysis for $C_{20}H_{32}O_2$ is:

|  | Percent C | Percent H |
| --- | --- | --- |
| Calculated | 78.89 | 10.59 |
| Found | 78.80 | 10.47 |
|  | 78.77 | 10.56 |

It is understood that the foregoing detailed description is given merely by way of illustration and that many variations may be made therein without departing from the spirit of my invention.

Having described my invention, what I desire to secure by Letters Patent is:

1. The steroid compounds of the formula:

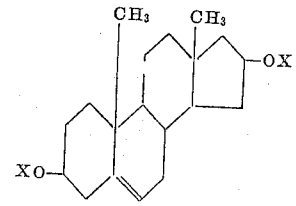

wherein X is of the group consisting of hydrogen and —R and in which R is a monovalent radical of the group consisting of methyl, ethyl, propyl, butyl, amyl, vinyl, cyclopentylpropyl, acetyl, propionyl, butyryl, cyclopentylpropionyl, palmityl, benzyl, benzoyl, tolyl and naphthyl groups.

2. The steroid compound Δ⁵-androsten-3β,16β-diol.
3. The steroid compound Δ⁵-androsten-3β,16α-diol.
4. The steroid compound Δ⁵-androsten-3β,16β-diol di-acetate.
5. The steroid compound 3β-methoxy-Δ⁵-androsten-16β-ol.
6. The steroid compound 3β-methoxy-Δ⁵-androsten-16α-ol-16-acetate.
7. The steroid compound Δ⁵-androsten-3β,16α-diol di-acetate.
8. The steroid compound 3β-methoxy-Δ⁵-androsten-16α-ol.
9. Process for the preparation of Δ⁵-androsten-3β,16β-diol which comprises reducing Δ⁵-androsten-3β-ol-16-one.
10. Process for the preparation of a 3-ether of Δ⁵-androsten-3β,16α-diol which comprises reacting Δ⁵-androsten-3β-ol-16-one with an etherifying agent to form a 3-ether of Δ⁵-androsten-3β-ol-16-one, reducing said compound to yield a 3-ether of Δ⁵-androsten-3β,16β-diol, reacting the hydroxy compound with an aryl sulfonyl halide to form a Δ⁵-androsten-3β,16β-diol-3β-ether-16β-aryl sulfonate, reacting the aryl sulfonic acid ester thus obtained with an alkali metal acetate and acetic acid to form a Δ⁵-androsten-3β,16α-diol-3β-ether-16α-acetate and hydrolyzing said compound to form a 3-ether of Δ⁵-androsten-3β,16α-diol.
11. Process for the preparation of Δ⁵-androsten-3β,16α-diol which comprises esterifying Δ⁵-androsten-3β,16β-diol to form a Δ⁵-androsten-3β,16β-diol-di-arylsulfonate, selectively hydrolyzing said di-arylsulfonate to form the Δ⁵-androsten-3β,16β-diol-16-arylsulfonate, reacting said Δ⁵-androsten-3β,16β-diol-16-arylsulfonate with an alkali metal acetate in acetic acid to epimerize said compound and to form Δ⁵-androsten-3β,16α-diol-16-acetate, and then hydrolyzing the latter to yield Δ⁵-androsten-3β,16α-diol.

12. Process for the preparation of Δ⁵-androsten-3β,16α-diol, which comprises esterifying Δ⁵-androsten-3β-ol-16-one to form a 3-ester of Δ⁵-androsten-3β-ol-16-one, reducing the 16-keto group, reacting the 3-ester of Δ⁵-androsten-3β,16β-diol obtained with an aryl sulfonyl halide and forming a Δ⁵-androsten-3β,16β-diol-3-ester-16β-aryl-sulfonate, reacting the latter with sodium acetate in acetic acid to epimerize said aryl sulfonate and form a Δ⁵-androsten-3β,16α-diol-3β-ester-16α-acetate and hydrolyzing said di-ester to the desired Δ⁵-androsten-3β,16α-diol.

13. The p-toluene sulfonates of the group consisting of Δ⁵-androsten-3β,16β-diol di-(p-toluenesulfonate), Δ⁵-androsten - 3β,16β - diol - 16 - (p-toluenesulfonate), Δ⁵-androsten - 3β,16β - diol - 3β - acetate - 16β - (p-toluenesulfonate) and 3β-methoxy-Δ⁵-androsten-16β-ol-16β-(p-toluenesulfonate).

No references cited.